UNITED STATES PATENT OFFICE.

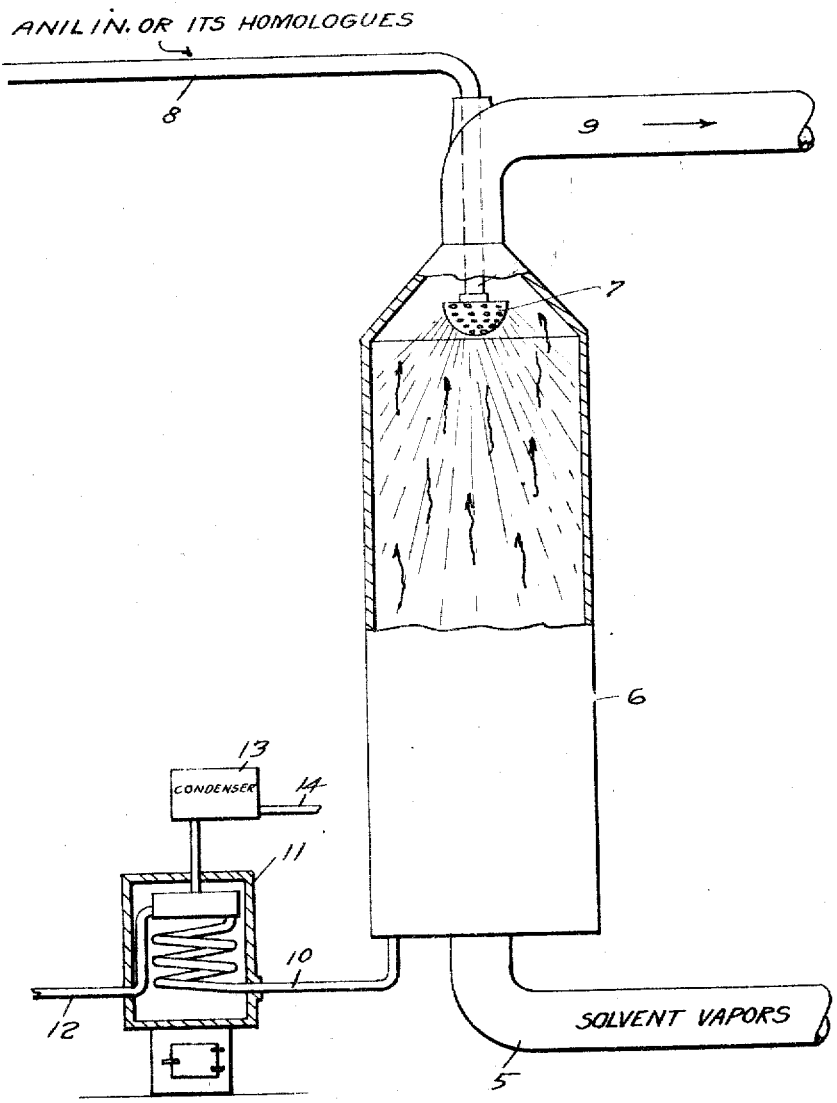

ULRIC J. LEBOURVEAU AND ARNOLD M. TAYLOR, OF STAMFORD, CONNECTICUT, ASSIGNORS TO ATLAS POWDER COMPANY, OF PHILADELPHIA, PENNSYLVANIA, A CORPORATION OF DELAWARE.

PROCESS OF RECOVERING VOLATILE SOLVENTS.

1,355,402.　　　　　Specification of Letters Patent.　　Patented Oct. 12, 1920.

Application filed March 5, 1920. Serial No. 363,512.

*To all whom it may concern:*

Be it known that we, ULRIC J. LEBOURVEAU and ARNOLD M. TAYLOR, citizens of the United States of America, residing at Stamford, in the county of Fairfield and State of Connecticut, have invented certain new and useful Improvements in Processes of Recovering Volatile Solvents, of which the following is a specification.

This invention relates to a method and means for treating mixtures of solvent vapors and air for the purpose of rendering it possible to readily and economically recover volatile solvents from mixtures of solvent vapors and air or other similar gases not easily condensed. The invention is particularly applicable to the recovering of solvents in those industries which use such volatile solvents as ether; benzol and toluol; those alcohols and the acetic esters of alcohols that have a boiling point lower than that of water at atmospheric pressure, and those ketones which are miscible or partly miscible with water, this invention being understood to be applicable in the recovery of any of these solvents alone or any mixtures or combination of said solvents.

Heretofore processes have been known that recover water soluble solvents in water and water insoluble solvents in such liquids as petroleum oils. Our process is an improvement on these classes of recovery systems in that both water soluble and water insoluble solvents are recovered in one and the same liquid.

Our process is based on the discovery that vapors of the above named solvents, from whatever source obtained, when mixed with air or other similar gases, are absorbed by anilin or its homologues, either used alone or in any suitable proportions.

In carrying out the invention the air vapor mixture containing the solvents to be recovered is passed through a suitable absorption tower through which the absorbing liquid is passed countercurrently, preferably in the form of a spray whereby the solvent vapors are absorbed and retained by the absorbing liquid. The gases, after being exhausted of their solvent vapors can be discharged into the air or returned from the tower to the place from which they were originally obtained, there to take up further amounts of solvent vapors. The absorbing liquid, *i. e.*, the anilin or its homologues, after being saturated to a reasonable amount with the solvent vapors, is freed of the absorbed solvents by distillation in a suitable still of common construction, the solvent vapors being condensed in a suitable condenser and collected as a liquid. The absorbing liquid, after being cooled, is again ready to take up additional solvents in the absorption tower.

For purposes of explanation we have diagrammatically illustrated in the accompanying drawing one form of apparatus that may be used in carrying out the invention.

In this drawing the numeral 5 designates a pipe serving to conduct the solvent vapors to an absorption tower 6. The solvent vapors may be derived from any source, depending upon the art in which the apparatus and process is used. It is common to recover solvent vapors released in the manufacture of explosives; in the manufacture of varnishes and lacquers and those vapors released from varnished and lacquered objects such as furniture and the like. It is therefore to be understood that the source of the solvent vapors delivered through pipe 5 may vary without departure from the invention. The solvent vapors pass through the absorption tower in one direction, as indicated by the arrows "*a*" and a spray consisting of anilin or its homologues is delivered through a spray head 7 and pipe 8 counter-currently to the direction of movement of the solvent vapors, said solvent vapors being absorbed and retained by the said anilin or its homologues.

The gases, after being exhausted of the solvent vapors, can be discharged directly into the air if desired, although preferably we return them through a duct 9 to the place from which they were originally obtained, there to take up further amounts of the solvent vapors. The absorbing liquid and the solvents carried thereby may be conducted from the tower 6 through a pipe 10 to a suitable still 11 where the absorbing liquid is freed of the absorbed solvents by distillation. The absorbing liquid which passes from the still through pipe 12, after being cooled, may be again used to take up additional solvents in the absorption tower.

The solvents freed from the absorbing liquid by distillation in the still 11 may be condensed in a suitable condenser 13 and delivered from pipe 14 as a liquid.

It is to be understood that the above series of operations may be carried out either as a continuous or non-continuous operation and that while the particular type of apparatus herein diagrammatically illustrated will accomplish the results sought, the invention is in nowise limited thereto, since the solvent vapors may be subjected to the action of the anilin or its homologues in any suitable type of apparatus that will bring said anilin into effective contact with said vapors.

Having now fully described our invention, what we claim and desire to protect by Letters-Patent is:

The herein described process of recovering volatile solvents from mixtures of solvent vapors and air, which consists in causing the solvents contained in the said mixture to be absorbed in anilin, separating the solvents from the anilin by distillation, and recovering the solvents by condensation.

In testimony whereof we affix our signatures in the presence of two witnesses.

ULRIC J. LEBOURVEAU.
ARNOLD M. TAYLOR.

Witnesses:
G. C. GIVEN,
A. V. SAORISON.